United States Patent
Tsuyuki

(10) Patent No.: US 7,130,117 B2
(45) Date of Patent: Oct. 31, 2006

(54) MICROSCOPE APPARATUS

(75) Inventor: Kei Tsuyuki, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/265,121

(22) Filed: Nov. 3, 2005

(65) Prior Publication Data

US 2006/0103922 A1    May 18, 2006

(30) Foreign Application Priority Data

Nov. 15, 2004    (JP) .............................. 2004-330377

(51) Int. Cl.
*G02B 21/00*    (2006.01)
*G02B 21/26*    (2006.01)

(52) U.S. Cl. ..................... 359/383; 359/368; 359/379; 359/381

(58) Field of Classification Search ......... 359/368–390
See application file for complete search history.

(56) References Cited

U.S. PATENT DOCUMENTS

| | | | |
|---|---|---|---|
| 4,155,622 A | 5/1979 | Klein ......................... | 359/379 |
| 5,122,648 A | 6/1992 | Cohen et al. ............ | 250/201.3 |
| 5,790,710 A | 8/1998 | Price et al. ................. | 382/255 |
| 5,793,526 A * | 8/1998 | Schalz ........................ | 359/392 |
| 6,307,672 B1 * | 10/2001 | DeNure ...................... | 359/382 |
| 6,473,228 B1 | 10/2002 | Toshimitsu ................. | 359/368 |
| 6,760,154 B1 * | 7/2004 | Focht ......................... | 359/383 |
| 6,937,390 B1 * | 8/2005 | Akiyama et al. ........... | 359/381 |
| 6,980,359 B1 * | 12/2005 | Yoneyama et al. ......... | 359/379 |
| 2003/0193345 A1 | 10/2003 | Hanson et al. .............. | 324/765 |

FOREIGN PATENT DOCUMENTS

| | | |
|---|---|---|
| JP | 11 264939 | 9/1999 |
| JP | 2004-004165 | 1/2004 |

OTHER PUBLICATIONS

English Abstract of Japanese reference No. 11-264939.
English Abstract of Japanese reference No. 2004-4165.

* cited by examiner

*Primary Examiner*—Thong Q Nguyen
(74) *Attorney, Agent, or Firm*—Kenyon & Kenyon LLP

(57) ABSTRACT

A specimen and an objective lens can be quickly brought close together or separated without an operator being concerned about the positional relationship between the specimen and the objective lens, and once the correct positional relationship is established, the focal position can be finely adjusted. The invention includes a first focusing mechanism for moving the objective lens in an optical axis direction relative to the specimen so as to approach the specimen or withdraw therefrom; a second focusing mechanism for displacing an internal optical system in the optical axis direction, and a switching device for switching between operating the first focusing mechanism and operating the second focusing mechanism when the objective lens is disposed at a predetermined switching position.

4 Claims, 4 Drawing Sheets

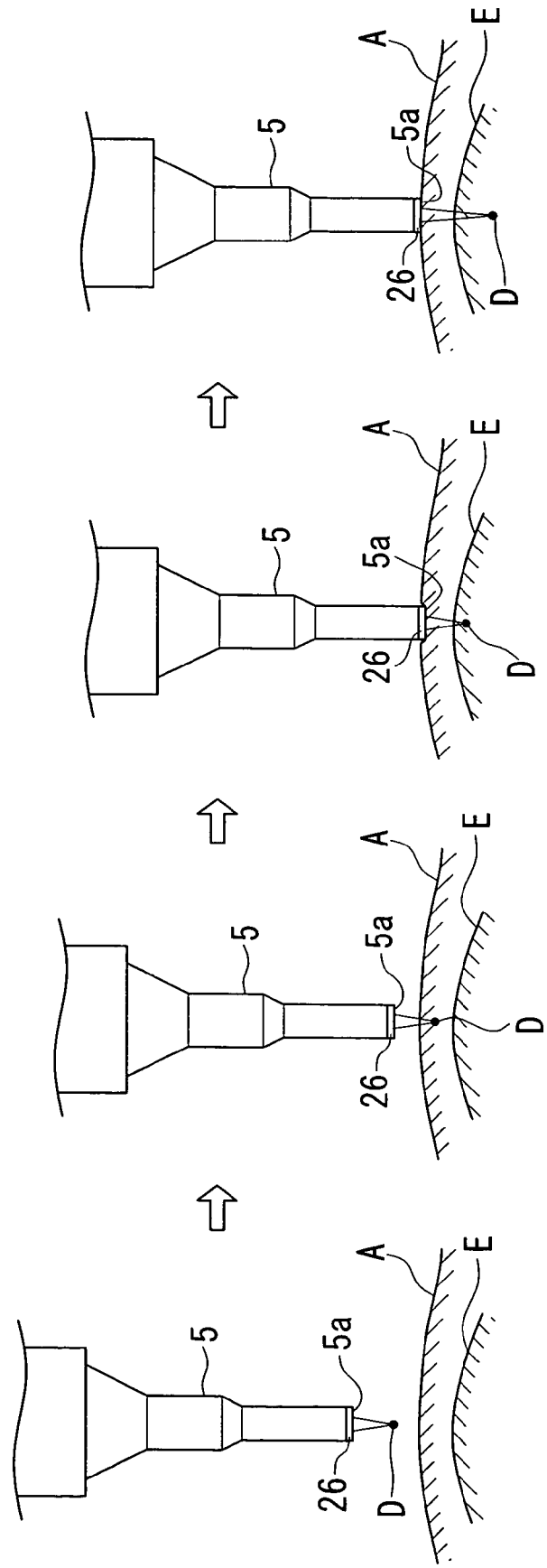

MICROSCOPE APPARATUS

BACKGROUND OF THE INVENTION

1. Field of the Invention

The present invention relates to a microscope apparatus.

This application is based on Japanese Patent Application No. 2004-330377, the content of which is incorporated herein by reference.

2. Description of Related Art

Known microscope apparatuses in the related art include a coarse adjustment knob for changing the relative position between a specimen and an objective lens in the optical axis direction to quickly and roughly move the focal position of the objective lens relative to the specimen and a fine adjustment knob for precisely moving the focal position of the objective lens relative to the specimen (for example, see Japanese Unexamined Patent Application Publication No. 2004-4165).

In such a known microscope apparatus, the operator performs rough focusing of the objective lens with respect to the specimen using the coarse adjustment knob followed by precise focusing using the fine adjustment knob.

However, since the focal position is adjusted quickly when using the adjustment knob, the operator must constantly check the relative positional relationship between the specimen and the objective lens while operating the coarse adjustment knob. In particular, when the specimen is easily damaged, care must be taken not to contact the objective lens with the specimen, thus damaging it. Also, when performing examination of a specimen immersed in liquid without using a liquid-immersion objective lens, care must be taken not to contact the objective lens with the liquid. Furthermore, in the case of a microscope used for examining the interior of a specimen, such as a confocal microscope, although the objective lens may make contact with the specimen, care must be taken not to apply excessive pressure.

Therefore, in order to avoid these problems, when the specimen and the objective lens are placed relatively close together, position adjustment using the coarse adjustment knob is stopped when the relative positions of the specimen and the objective lens are sufficiently separated, and from that point, they can be carefully brought closer together by using the fine adjustment knob. In such a case, however, the time required to set the focal position is rather long, resulting in the drawback that the examination time is also increased.

Furthermore, even if adjustment is carried out with the coarse adjustment knob until the relative positions of the specimen and the objective lens are sufficiently close together, if the positional relationship between the specimen and the objective lens is not checked while adjusting the position using the fine focus adjustment knob, the problem of contact between the specimen and the objective lens or excessive pressure being applied still occurs.

In particular, in the case of a fluorescence microscope which is operated by remote control in a dark room or a black box, to check the relative positional relationship between the specimen and the objective lens, a light must be turned on or the black box must be opened during examination. Another problem, therefore, is that the checking procedure becomes extremely troublesome and examination cannot be carried out efficiently.

BRIEF SUMMARY OF THE INVENTION

The present invention has been conceived in light of the circumstances described above, and an object thereof is to provide a microscope apparatus in which a specimen and an objective lens can be quickly brought close together or separated from each other without an operator being concerned about the positional relationship between the specimen and the objective lens, and once the correct positional relationship has been established, the focal position of the objective lens can be finely adjusted.

In order to achieve the object described above, the present invention provides the following solutions.

The present invention provides a microscope apparatus including a first focusing mechanism for causing an objective lens to move relative to a specimen along an optical axis direction so as to approach the specimen or withdraw therefrom; a second focusing mechanism for displacing an internal optical system in the optical axis direction; and a switching device for switching between operating the first focusing mechanism and operating the second focusing mechanism when the objective lens is disposed at a predetermined switching position.

According to the present invention, the objective lens is made to approach the specimen along the optical axis direction by operating the first focusing mechanism. Then, once the objective lens is located at the predetermined switching position, the switching device is operated to stop the first focusing mechanism and switch to the second focusing mechanism. When the second focusing mechanism is operated, the internal optical system is displaced in the optical axis direction towards the specimen without moving the objective lens.

Therefore, correctly setting the switching position allows the objective lens to make contact with the specimen without damaging the specimen. On the other hand, when moving the focal position in a direction away from the specimen, the second focusing mechanism is operated first, and then the first focusing mechanism is operated to pull the objective lens away from the specimen.

Accordingly, the operator can quickly bring the specimen and the objective lens close to each other or separate them from each other without being concerned about the positional relationship between the specimen and the objective lens. In addition, once the correct positional relationship has been established, the focal position can be finely adjusted.

The present invention described above may further include a distance sensor for detecting that a tip of the objective lens is disposed at a predetermined position with respect to the specimen, wherein the switching device switches the operation based on a detection signal from the distance sensor.

With this configuration, the switching position can be detected using the position sensor, and the operation can thus be switched between the first focusing mechanism and the second focusing mechanism. Therefore, this is advantageous in cases where the tip of the objective lens and the specimen should not make contact, for example, if the specimen is fragile or easily damaged.

The present invention described above may further include a contact sensor for detecting that a tip of the objective lens contacts the specimen, wherein the switching device switches the operation based on a detection signal from the contact sensor.

With this configuration, when the tip of the objective lens makes contact with the specimen, the switching position is detected using the contact sensor, and the operation is switched between the first focusing mechanism and the second focusing mechanism. Therefore, when carrying out examination while the tip of the objective lens is in contact with the specimen and while adjusting the focal position, an advantage is afforded in cases where, for example, examination of a living organism is carried out while suppressing pulsating of the organism by pressing it with the objective lens in order to prevent image blurring.

The present invention described above may further include a distance sensor for detecting that a tip of the objective lens is positioned at a predetermined distance with respect to a liquid surface when the specimen is immersed in a liquid, wherein the switching device switches the operation based on a detection signal from the distance sensor.

With this configuration, the distance from the liquid surface is detected using the distance sensor, and based on the detection signal, the switching device can switch between operating the first focusing mechanism and operating the second focusing mechanism. Therefore, this is advantageous in cases where the tip of the objective lens should not make contact with the liquid surface, for example, if the objective lens is not a liquid-immersion lens.

According to the present invention, since the switching device switches between operating the first focusing mechanism to move the objective lens and operating the second focusing method to move the internal optical component, the operator can quickly bring the specimen and the objective lens close together or separate them without being concerned about the positional relationship between the specimen and the objective lens. Once the correct positional relationship has been established, the focal position can be finely adjusted.

BRIEF DESCRIPTION OF THE SEVERAL VIEWS OF THE DRAWINGS

FIGS. 4A to 4D show the positional relationship between the objective lens unit and the specimen in the operations shown in FIGS. 2 and 3.

DETAILED DESCRIPTION OF THE INVENTION

A microscope apparatus 1 according to a first embodiment of the present invention will be described below with reference to FIGS. 1 to 3 and FIGS. 4A to 4D.

Figure 1:
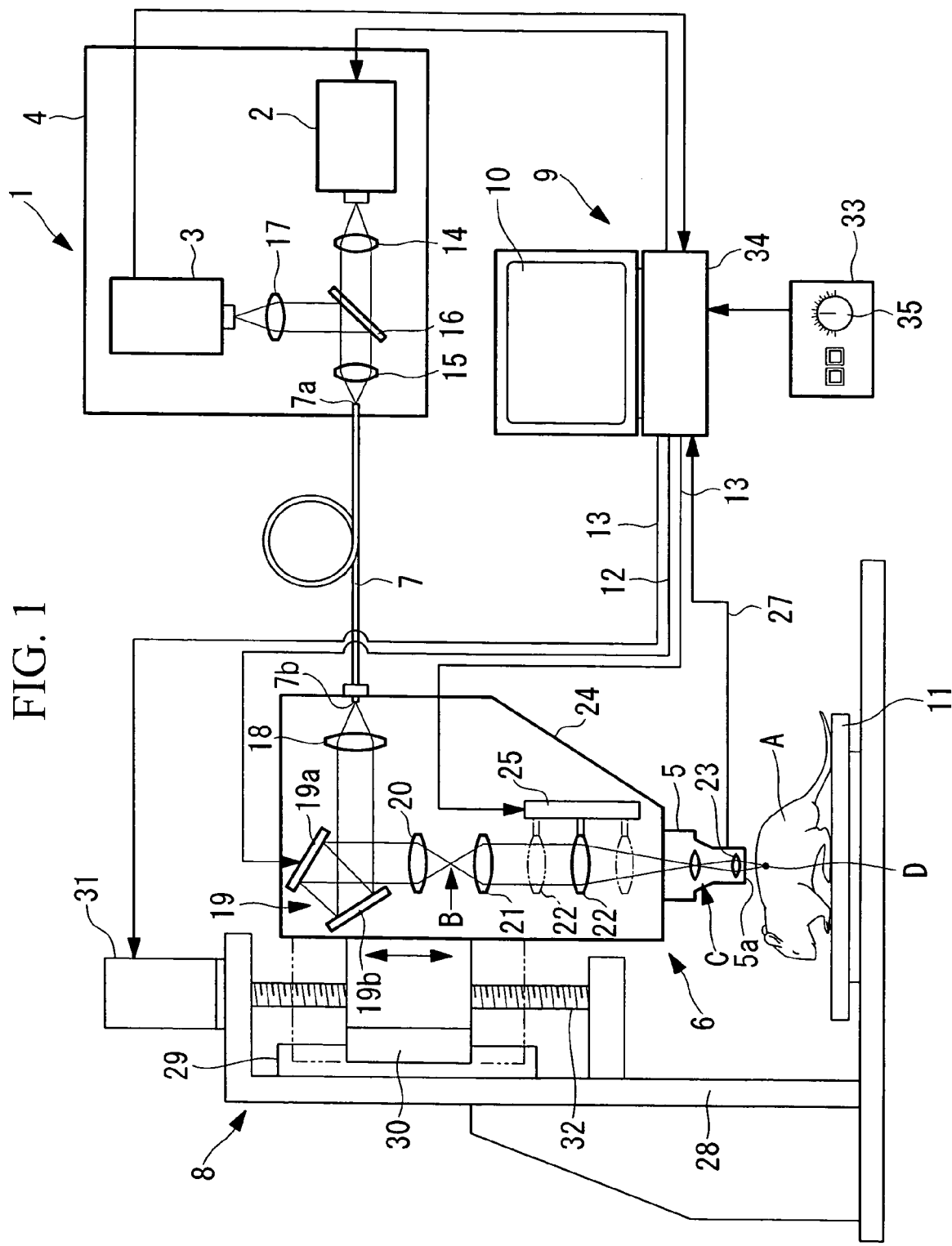
FIG. 1 is an overall schematic diagram showing a microscope apparatus according to an embodiment of the present invention.

As shown in FIG. 1, the microscope apparatus 1 according to the present embodiment, for example, a laser-scanning microscope, includes an optical unit 4 formed of a laser light source 2 for emitting laser light and a optical detector 3 for detecting observation light returning from a specimen A; a measurement head 6 having an objective lens unit 5 that is placed in contact with the specimen A; an optical fiber 7 for connecting the optical unit 4 and the measurement head 6; a raising and lowering mechanism (first focusing mechanism) 8 for raising and lowering the measurement head 6; a control unit 9 for controlling the optical unit 4 and the measurement head 6; and a monitor 10 for displaying images detected by the optical detector 3. Reference numeral 11 represents a stage on which the specimen A is mounted, and reference numerals 12 and 13 represent cables for connecting the measurement head 6 and the control unit 9. The optical unit 4 and the measurement head 6 are not necessarily connected by the optical fiber 7; they may also be directly coupled together.

The optical unit 4 also includes a collimator lens 14 for collimating the light emitted from the laser light source 2, a focusing lens 15 for focusing the collimated light onto an end 7a of the optical fiber 7, a dichroic mirror 16 for splitting the laser light (excitation light) and the observation light (fluorescence), and a focusing lens 17 for focusing the fluorescence split off by the dichroic mirror 16 onto the optical detector 3. The optical detector 3 is, for example, a photomultiplier tube (PMT).

The measurement head 6 includes a collimator lens 18 for converting the laser light transmitted through the optical fiber 7 into a collimated beam; an optical scanning unit 19 for two-dimensionally scanning the collimated laser beam; a pupil projection optical system 20 for converging the scanned beam to form a first intermediate image B; a first imaging lens 21 for converting the laser light forming the first intermediate image B into a collimated beam; a second imaging lens 22 for converging the collimated laser beam to form a second intermediate image C; and an objective lens 23 for re-imaging the laser light forming the second intermediate image C onto the specimen A. The collimator lens 18, the optical scanning unit 19, the pupil projection optical system 20, the first imaging lens 21, and the second imaging lens 22 are contained in a housing 24, and the objective lens 23 is contained in an objective lens unit 5 which can be attached to and removed from the housing 24.

The optical scanning unit 19 is a so-called proximity galvanometer mirror in which two galvanometer mirrors 19a and 19b, which each rock about one axis, are disposed close to the pupil conjugate plane of the objective lens with the two axes thereof being orthogonal. The optical scanning unit 19 is connected to the control unit 9 by the cable 12 and is made to rock at high speed about the two orthogonal axes based on instructions from the control unit 9. Accordingly, by moving the laser beam incident on the galvanometer mirrors 19a and 19b back and forth over a predetermined angular range, it is possible to scan the laser beam over a predetermined region on the specimen A.

The second imaging lens 22 is supported by a uniaxial actuator (second focusing mechanism) 25 so that it can be moved in a straight line in the direction of the optical axis. Moving the second imaging lens 22 in a straight line in the optical axis direction by operating the actuator 25 allows the focal position to be adjusted without displacing a tip 5a of the objective lens unit 5, which is a finite optical system. Therefore, pulsing of the specimen A can be suppressed using the tip 5a of the objective lens unit 5, and clear, blur-free images can thus be obtained. In addition, the examination depth can be set at a desired position for carrying out examination.

The objective lens unit 5 is of the type in which the tip 5a is placed in contact with the surface of the specimen A during examination and is provided with a contact sensor 26 (refer to FIGS. 4A to 4D) for detecting when the tip 5a makes contact with the specimen A. A contact detection signal detected by the contact sensor 26 is sent to the control unit 9 via a cable 27.

The raising and lowering mechanism 8 includes a base 28, a linear guide 29 that is fixed to the base 28, a slider 30 that is supported so as to be movable upwards and downwards along the linear guide 29, a motor 31 for driving the slider 30 upwards and downwards, and a ball screw 32. The slider 30 is fixed to the housing 24 of the measurement head 6. Therefore, by operating the motor 31 to rotate the ball screw 32, the slider 30 is driven upwards and downwards along the linear guide 29, and the measurement head 6, which is fixed to the slider 30, also moves upwards and downwards.

The control unit 9 includes an operating unit 33 and a processing unit 34. The operating unit 33 includes, for example, a dial 35 that can be rotated by the operator. For instance, when the dial 35 is turned to the right, a command for lowering the focal position D is sent to the processing unit 34, and when it is turned to the left, a command for raising the focal position D is sent to the processing unit 34.

The processing unit 34 controls the operation of the optical unit 4 and the optical scanning unit 19 in the measurement head 6, and also controls the operation of the raising and lowering mechanism 8 and the actuator 25 in the measurement head 6.

More specifically, when the processing unit 34 sends deflection-angle commands to the two galvanometer mirrors 19a and 19b, the laser beam from the laser light source 2 is two-dimensionally scanned. The processing unit 34 also issues commands for outputting and stopping laser light, for adjusting the intensity, and so forth to the laser light source 2 in the optical unit 4. In addition, the processing unit 34 associates the detection signals sent from the optical detector 3 in the optical unit 4 with the scanning position of the laser beam scanned by the galvanometer mirrors 19a and 19b and stores them in order to generate two-dimensional images for display on the monitor 10.

The contact signal output from the contact sensor 26 provided at the tip 5a of the objective lens unit 5 is input to the processing unit 34. The device that is driven to adjust the focal position when operating the operating unit 33 depends on whether or not the contact signal is present; that is, the processing unit 34 switches between the raising and lowering mechanism 8 and the actuator 25 based on this signal.

Figure 2:
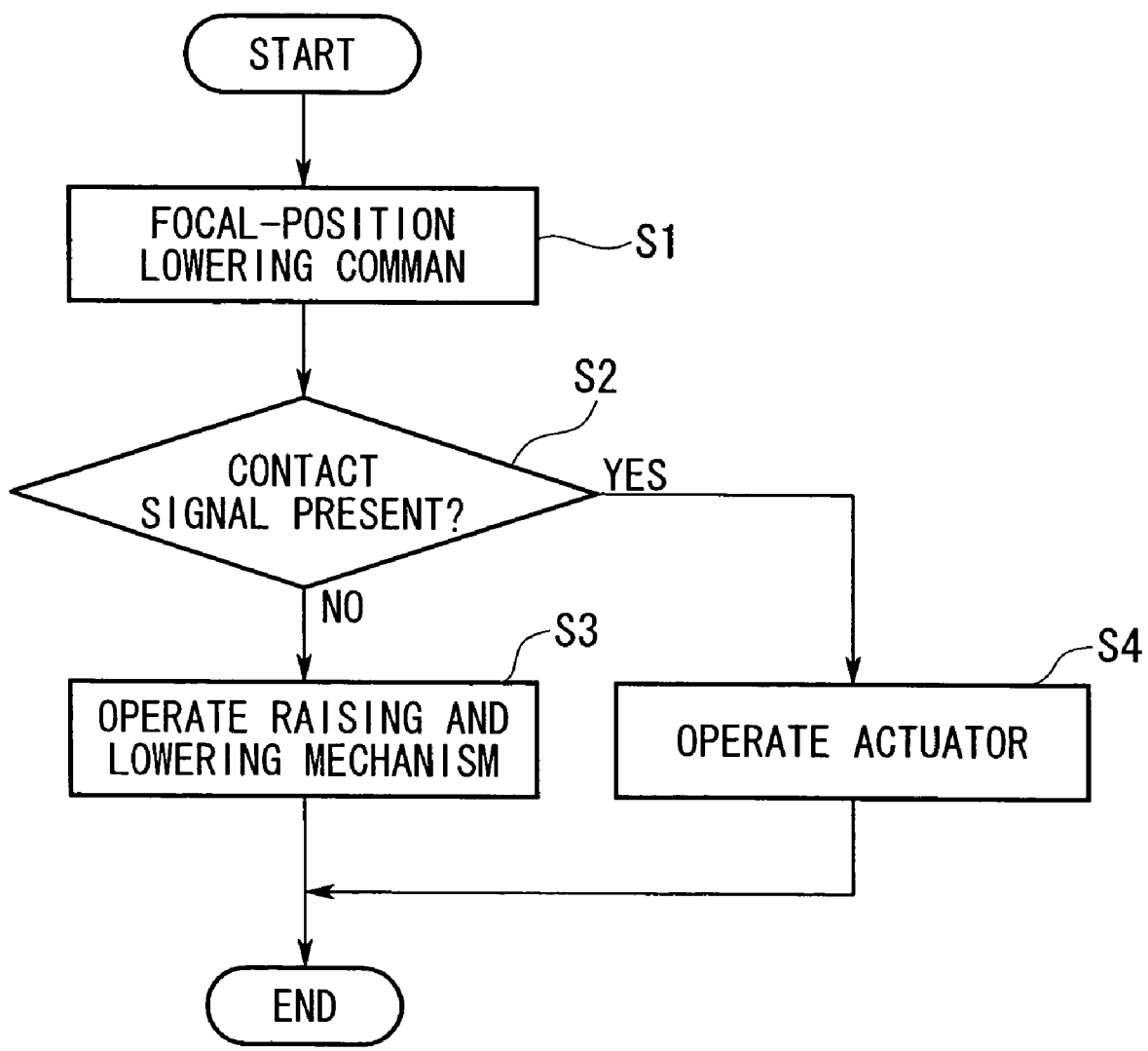
FIG. 2 is a flowchart explaining the operation of lowering the focal position with the microscope apparatus shown in FIG. 1.
Figure 3:
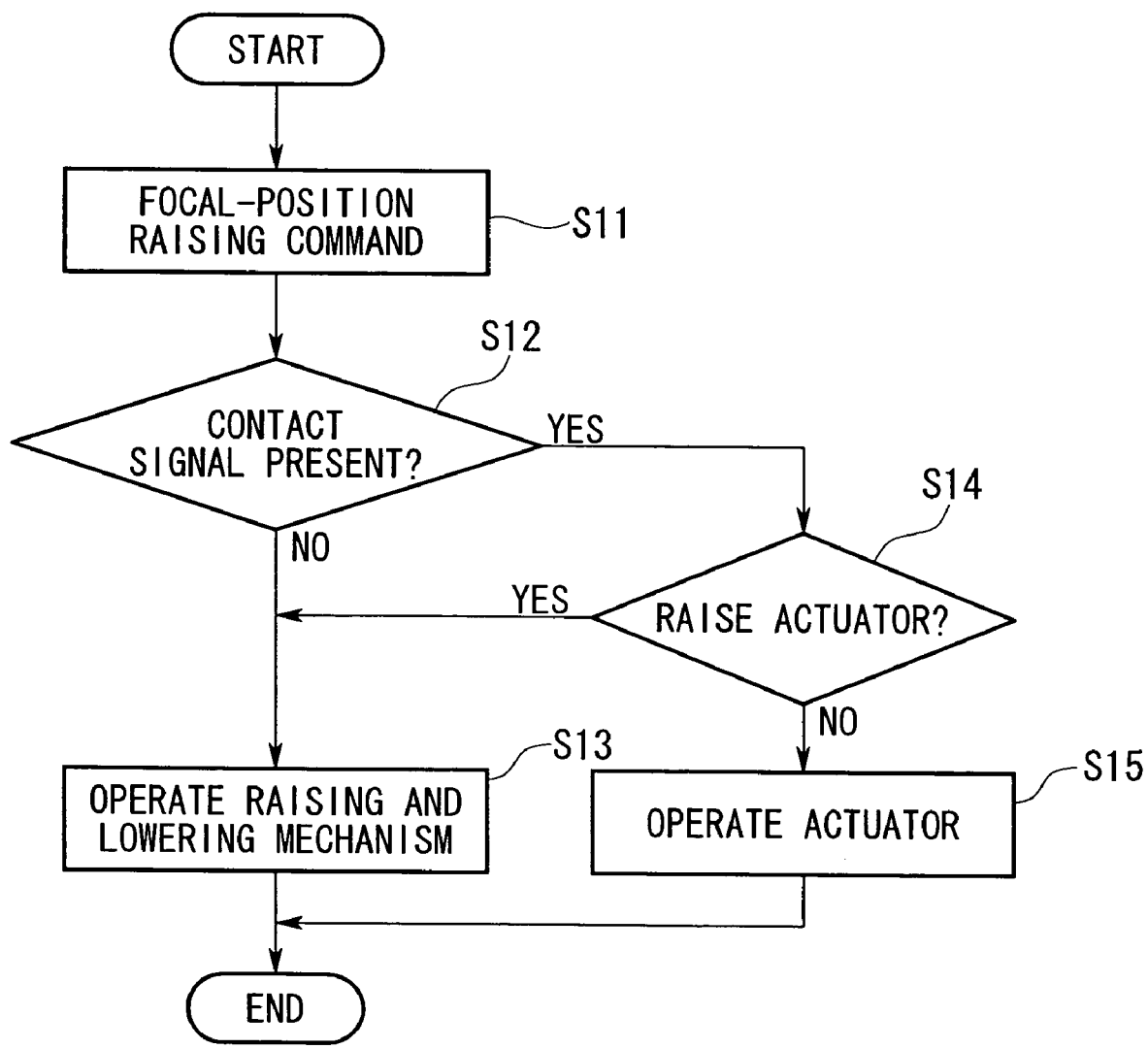
FIG. 3 is a flowchart explaining the operation of raising the focal position with the microscope apparatus shown in FIG. 1.

More specifically, as shown in FIG. 2, when a focal-position lowering command from the operating unit 33 is input to the processing unit 34 (step S1), the processing unit 34 determines whether or not the contact signal from the contact sensor 26 is present (step S2). When there is no contact signal, the processing unit 34 operates the raising and lowering mechanism 8 (step S3), and when the contact signal is present, the processing unit 34 operates the linear actuator 25 (step S4). As shown in FIG. 3, when a focal-position raising command from the operating unit 33 is input to the processing unit 34 (step S11), the processing unit 34 determines whether or not the contact signal from the contact sensor 26 is present (step S12). When there is no contact signal, the processing unit 34 operates the raising and lowering mechanism 8 (step S13), and when the contact signal is present, the processing unit 34 first operates the linear actuator 25 (step S14), and once the linear actuator 25 has moved to the upper limit of its operating range, the processing unit 34 then operates the raising and lowering mechanism 8 (step S15).

The operation of the microscope apparatus 1 according to the present embodiment, configured in this way, will be described below.

With the microscope apparatus 1 according to the present embodiment, the laser beam emitted from the laser light source 2 is introduced to the optical fiber 7 via the collimator lens 14 and the focusing lens 15, propagates through the optical fiber 7, and is then incident on the collimator lens 18.

The laser beam is collimated at the collimator lens 18 and is incident on the optical scanning unit 19. The galvanometer mirrors 19a and 19b are made to rock back and forth over a predetermined angular range to move the incident laser beam back and forth over a predetermined angular range and direct it towards the pupil projection optical system 20.

The laser beam entering the pupil projection optical system 20 initially forms the intermediate image B and is then incident on the first imaging lens 21, where it is converted to a substantially collimated beam, and is then incident on the second imaging lens 22. The laser beam is focused by the second imaging lens 22 to form the second intermediate image C and enter the objective lens 23 inside the objective lens unit 5. Then, the laser beam entering the objective lens 23 is re-imaged at a position shifted from the tip 5a of the objective lens unit 5 by a certain distance (working distance), which depends on the optical systems 18 and 20 to 23.

When the laser beam irradiates the specimen A, fluorescent dye introduced into the specimen A is excited by the laser light and generates fluorescence. The fluorescence generated returns along the same path as the incident path, that is, via the objective lens 23, the second imaging lens 22, the first imaging lens 21, the pupil projection optical system 20, the galvanometer mirrors 19a and 19b, and the collimator lens 18, and is focused by the collimator lens 18 onto an end face 7b of the optical fiber 7. In other words, the position D where the laser beam is re-imaged by the objective lens 23, that is, the focal position D of the laser-scanning microscope apparatus 1 according to the present embodiment, is a conjugate position with respect to the end face 7b of the optical fiber 7 inside the housing 24. Therefore, the end face 7b of the optical fiber 7 functions as a confocal pinhole so that only return light emitted from the focal position D is allowed to enter the optical fiber 7.

The fluorescence propagating through the optical fiber 7 and returning to the optical unit 4 is split off from the laser light by the dichroic mirror 16 and is focused by the focusing lens 17 onto the optical detector 3 to be detected thereat. Image signals output from the optical detector 3 are subjected to image processing in the processing unit 34 and are then displayed on the monitor 10.

First, as shown in FIG. 4A, a case will be described in which, using the laser-scanning microscope apparatus 1 according to the present embodiment, the tip 5a of the objective lens unit 5 is moved from a position above the surface of the specimen A so that the focal position D is brought close to the specimen A and is eventually disposed at an examination site E located at a predetermined depth below the surface of the specimen A.

The operator turns the dial 35 on the operating unit 33 to the right to lower the focal position D. In this case, when no contact signal from the contact sensor 26 is input to the processing unit 34, the actuator 25 is not operated, and only the raising and lowering mechanism 8 is operated. The actuator 25 remains at the uppermost position of its operating range.

When the operator continues to turn the dial 35 to the right while looking at the monitor 10, as shown in FIG. 4B, images at each position in the specimen A that the focal position D passes through are displayed on the monitor 10. Then, as shown in FIG. 4C, the tip 5a of the objective lens unit 5 makes contact with the surface of the specimen A, whereupon the contact sensor 26 is activated and outputs the contact signal. Therefore, the processing unit 34 switches from issuing commands to the raising and lowering mechanism 8 to issuing commands to the actuator 25.

The tip 5a of the objective lens unit 5 stops moving when it is in contact with the surface of the specimen A, and the second imaging lens 22 in the measurement head 6 is lowered by the actuator 25, as shown in FIG. 4D. Therefore, while the objective lens unit 5 remains stopped, it is possible to lower the focal position D further inside the specimen A, as shown in FIG. 4D, and it is possible to obtain images of the examination site E.

In this case, with the laser-scanning microscope apparatus 1 according to the present embodiment, since the operation can be automatically switched between the raising and lowering mechanism 8 and the actuator 25 on the basis of the contact sensor 26 at the tip 5a of the objective lens unit 5 detecting contact with the specimen A, the operator does not need to visually confirm whether the tip 5a of the objective lens unit 5 has made contact with the specimen A. In other words, the operator can simply operate the dial 35 on the operating unit 33 while looking at the monitor 10. Therefore, an advantage is afforded in that laborious tasks such as confirming contact between the objective lens unit 5 and the specimen A, switching the operation between the raising and lowering mechanism 8 and the actuator 25 at contact time, and so forth are eliminated.

In particular, since the light intensity when performing fluoroscopy is weak, it is generally carried out in a dark room or a black box. Therefore, instead of the operator having to visually confirm contact between the tip 5a of the objective lens unit 5 and the specimen A, with the laser-scanning microscope apparatus 1 according to the present embodiment, it is not necessary to turn on a light or open the black box in order to confirm contact, which is extremely beneficial.

Moreover, the procedure of lowering the focal position D while visually confirming contact between the tip 5a of the objective lens unit 5 and the specimen A takes a long time if the operator is not experienced. In contrast, with the present embodiment, the operator can lower the focal position D without being concerned about contact between the objective lens unit 5 and the specimen A, which allows the focal position D to be lowered to the desired position more quickly. Therefore, the time required for examination or for making preparations for examination can be reduced.

Furthermore, with the laser-scanning microscope apparatus 1 according to the present embodiment, lowering of the measurement head 6 by the raising and lowering mechanism 8, more precisely, lowering of the objective lens unit 5, is stopped once the tip 5a of the objective lens unit 5 makes contact with the surface of the specimen A. Therefore, the objective lens unit 5 is prevented from excessively pressing against the specimen A. As a result, damage to the specimen A or to the objective lens unit 5 can be avoided.

Next, raising of the focal position D from the point where the tip 5a of the objective lens unit 5 is in contact with the specimen A, as shown in FIG. 4D, will be described.

Since the tip 5a of the objective lens unit 5 is in contact with the specimen A, the contact signal from the contact sensor 26 is input to the processing unit 34. Therefore, when the operator turns the dial 35 to the left in this state, as shown in FIG. 4C, while the tip 5a of the objective lens unit 5 remains in contact with the surface of the specimen A, without operating the raising and lowering mechanism 8, the actuator 25 is operated to raise the second imaging lens 22, which causes the focal position D to be raised.

Then, once the second imaging lens 22 has reached the upper limit of its operating range, the operating unit 34 switches from the actuator 25 to the raising and lowering mechanism 8, and the objective lens unit 5 thus moves away from the surface of the specimen A.

In this case too, the operator can raise the focal position D without being concerned about contact between the objective lens unit 5 and the specimen A.

By consecutively switching between moving the measurement head 6 with the raising and lowering mechanism 8 and moving the second imaging lens 22 with the actuator 25 when raising or lowering the focal position D, the operator who operates the dial 35 while looking at the monitor 10 does not notice the switching and there is a smooth transition on the screen. Conversely, by temporarily stopping the operation when switching between moving the measurement head 6 with the raising and lowering mechanism 8 and moving the second imaging lens 22 with the actuator 25, the operator who operates the dial 35 while looking at the monitor 10 can determine that the tip 5a of the objective lens unit 5 has made contact with the surface of the specimen or whether it has separated therefrom. Alternatively, rather than stopping the operation, the switch from the raising and lowering mechanism 8 to the actuator 25 or vice versa may be indicated in another way, for instance, by an indicator such as a lamp provided on the operating unit 33 or by emitting a sound.

In the embodiment described above, the objective lens unit 5 is fixed to the housing 24 of the measurement head 6 and the measurement head 6 is raised and lowered using the raising and lowering mechanism 8. Instead of this, however, the housing 24 of the measurement head 6 may be fixed to the base 28 and a different raising and lowering mechanism 8 may be provided for raising and lowering the objective lens unit 5 with respect to the housing 24. Alternatively, instead of raising and lowering the objective lens unit 5, a raising and lowering mechanism may be provided for raising and lowering the stage 11.

In the embodiment described above, the contact sensor 26 provided at the tip 5a of the objective lens unit 5 determines whether or not the tip 5a has made contact with the specimen A to switch between the raising and lowering mechanism 8 and the actuator 25 for moving the focal position D. Instead of this, however, the contact pressure may be detected using a pressure sensor and the operation switched when a predetermined pressure is reached. Accordingly, the pressure conditions at the specimen A can be determined more accurately and directly. For example, when examining a specimen A such as a small animal that pulsates due to a heartbeat or respiration, pressing the objective lens unit 5 to the specimen A with a predetermined contact pressure suppresses the pulsation, which is advantageous since it allows clear, blur-free images to be acquired.

Instead of the contact sensor 26, a distance sensor, such as a laser displacement meter, may be employed. In such a case, when the tip 5a of the objective lens unit 5 is a certain distance from the specimen A, the operation can be switched between the raising and lowering mechanism 8 and the actuator 25.

Comparing the case where the objective lens unit 5 is moved and the case where the second imaging lens 22 is moved, the speed at which the focal point D moves is higher when moving the objective lens unit 5. Therefore, when approaching to within a predetermined distance from the specimen A, the focal position D can be moved quickly with respect to the specimen A using the raising and lowering mechanism 8 and then moved more precisely using the actuator 25. Also, when pulling the focal position D away from the specimen A, the objective lens unit 5 can first be slowly withdrawn to a predetermined position and then withdrawn more quickly, which allows the objective lens unit 5 to quickly get out of the way to quickly ensure sufficient working space between the objective lens unit 5 and the specimen A.

Instead of providing a sensor on the tip of the objective lens unit 5, based on position information used in controlling the positions of the raising and lowering mechanism 8 and the actuator 25, switching may be performed when the raising and lowering mechanism 8 and the actuator 25 are located at predetermined positions.

In the embodiment described above, the second imaging lens 22 is raised and lowered by the actuator 25. Instead of this, however, the collimator lens 18 may be displaced in the optical axis direction. Alternatively, the end face 7b of the optical fiber 7 may be moved in the optical axis direction.

Furthermore, although the embodiment described above has been described in terms of the laser-scanning microscope apparatus 1, the present invention is not limited to this, and any other type of microscope apparatus can be employed.

When the specimen is immersed in a liquid, a distance sensor for detecting that the tip 5a of the objective lens unit 5 is positioned at a predetermined distance relative to the liquid surface may be used.

Accordingly, the distance from the surface of the liquid is detected by the distance sensor, and based on the detection signal, the processing unit 34 can switch between the raising and lowering mechanism 8 and the actuator 25. This is advantageous in cases where the tip 5a of the objective lens unit 5 should not make contact with the liquid surface, for example, if the objective lens unit 5 is not a liquid-immersion lens.

When the tip 5a of the objective lens unit 5 is withdrawn after being in contact with the specimen A, in the embodiment described above, the raising and lowering mechanism 8 is operated once the second imaging lens 22 is located at the uppermost position of its operating range by the actuator 25. Instead of this, however, an origin may be defined at an intermediate position in the operating range, and the raising and lowering mechanism 8 may be operated when the actuator 25 makes the second imaging lens 22 return to the origin.

What is claimed is:

1. A microscope apparatus comprising:
   a first focusing mechanism for causing an objective lens to move relative to a specimen along an optical axis direction so as to approach the specimen or withdraw therefrom;
   a second focusing mechanism for displacing an internal optical system in the optical axis direction; and
   a switching device for switching between operating the first focusing mechanism and operating the second focusing mechanism when the objective lens is disposed at a predetermined switching position.

2. A microscope apparatus according to claim 1, further comprising:
   a distance sensor for detecting that a tip of the objective lens is disposed at a predetermined position with respect to the specimen,
   wherein the switching device switches the operation based on a detection signal from the distance sensor.

3. A microscope apparatus according to claim 1, further comprising:
   a contact sensor for detecting that a tip of the objective lens contacts the specimen,
   wherein the switching device switches the operation based on a detection signal from the contact sensor.

4. A microscope apparatus according to claim 1, further comprising:
   a distance sensor for detecting that a tip of the objective lens is positioned at a predetermined distance with respect to a liquid surface when the specimen is immersed in a liquid,
   wherein the switching device switches the operation based on a detection signal from the distance sensor.

* * * * *